United States Patent
Fritz

(10) Patent No.: US 6,722,661 B2
(45) Date of Patent: Apr. 20, 2004

(54) MULTILAYER GASKET

(75) Inventor: Wolfgang Fritz, Metzingen (DE)

(73) Assignee: Elring Klinger AG, Dettingen (DE)

( * ) Notice: Subject to any disclaimer, the term of this patent is extended or adjusted under 35 U.S.C. 154(b) by 0 days.

(21) Appl. No.: 10/277,592

(22) Filed: Oct. 21, 2002

(65) Prior Publication Data

US 2003/0122319 A1 Jul. 3, 2003

(30) Foreign Application Priority Data

Oct. 25, 2001 (DE) .......................................... 101 52 797

(51) Int. Cl.[7] .............................................. F02F 11/00
(52) U.S. Cl. ......................... 277/598; 277/924; 29/513; 29/888.3
(58) Field of Search ................. 29/888.3, 513; 277/590–598, 922, 924, 925

(56) References Cited

U.S. PATENT DOCUMENTS

| | | | |
|---|---|---|---|
| 4,126,318 A | * 11/1978 | Belter | 277/598 |
| 5,348,311 A | 9/1994 | Miyaoh et al. | 277/9 |
| 5,375,851 A | * 12/1994 | Mockenhaupt | 277/598 |
| 5,671,927 A | 9/1997 | Schweiger | 277/9 |
| 5,979,905 A | * 11/1999 | Fischer et al. | 277/591 |
| 6,027,124 A | * 2/2000 | Ishida et al. | 277/595 |
| 6,062,573 A | 5/2000 | Budovec et al. | 277/598 |
| 6,076,833 A | * 6/2000 | Geshi | 277/595 |
| 6,213,477 B1 | * 4/2001 | Miyaoh | 277/598 |
| 6,283,480 B1 | * 9/2001 | Miura et al. | 277/593 |

FOREIGN PATENT DOCUMENTS

| | | |
|---|---|---|
| DE | 199 23 248 | 11/1999 |
| EP | 383 993 | 8/1990 |
| FR | 1 414 951 | 9/1964 |
| FR | 2 426 506 | 12/1979 |
| JP | 57190736 | 11/1982 |

* cited by examiner

*Primary Examiner*—Anthony Knight
*Assistant Examiner*—Vishal Patel

(57) ABSTRACT

In order to provide a multilayer gasket, which comprises at least one first layer and one second layer and at least one joining device for joining the layers of the gasket to one another and in which the layers of the gasket are joined to one another in a simple and reliable manner, it is proposed that the joining device comprises at least two through-holes in the first layer, at least one through-opening in the second layer and a joining element constructed separately from the first layer and the second layer, wherein the joining element penetrates the through-openings of the first layer and the through-opening of the second layer and engages behind a retention region of the second layer in such a way that the first layer, the second layer and the joining element are form locked, preventing them from moving apart from one another.

9 Claims, 4 Drawing Sheets

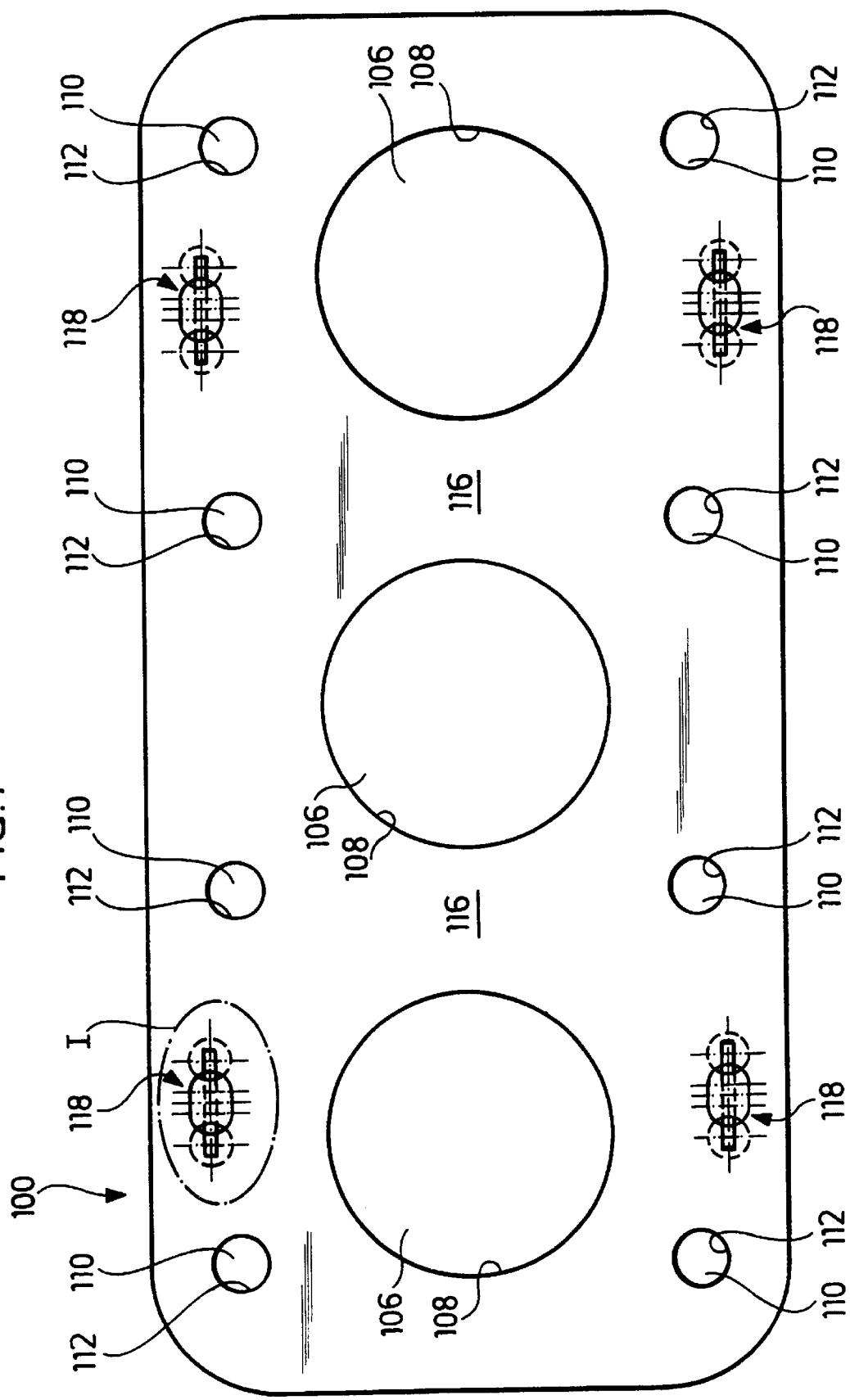

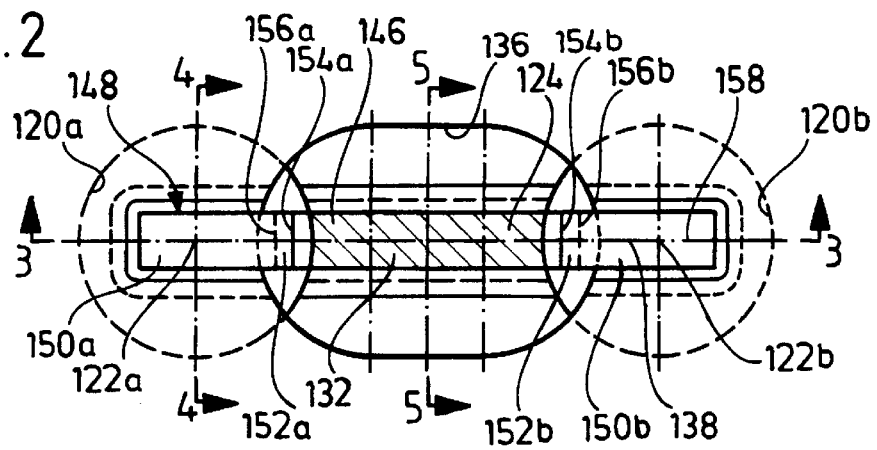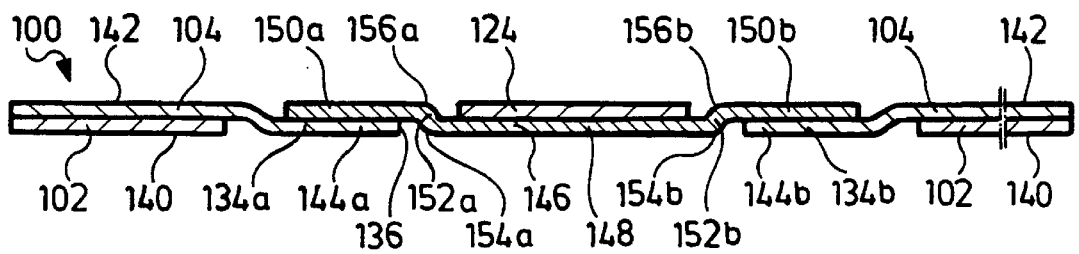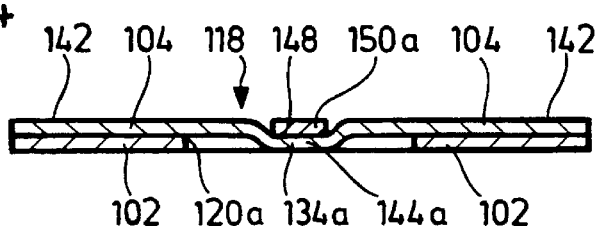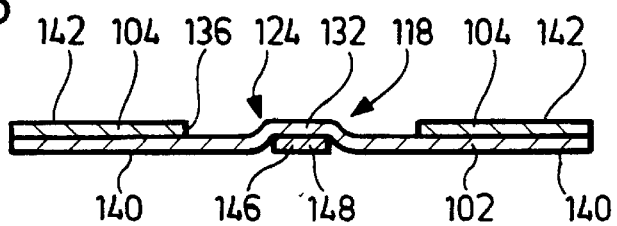

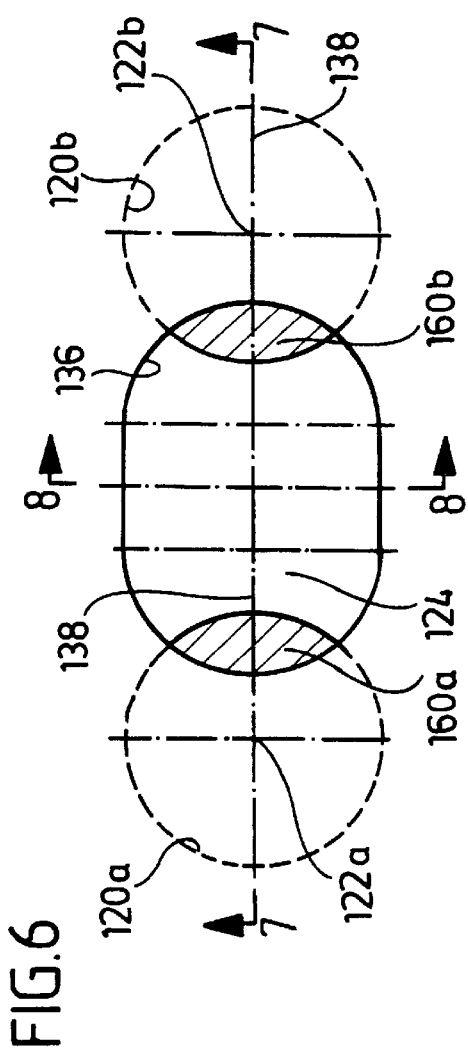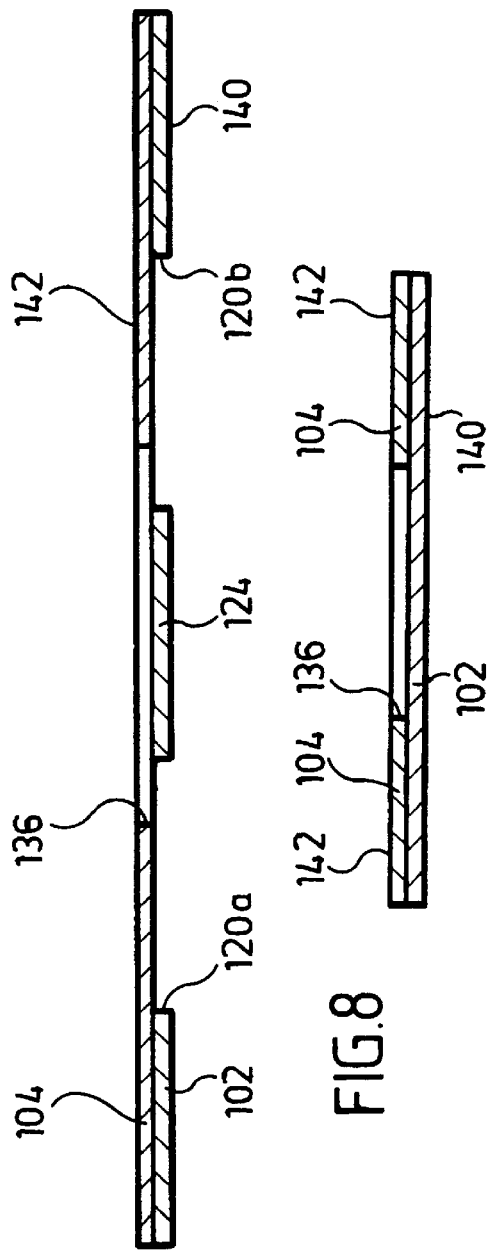

MULTILAYER GASKET

Figure 9:
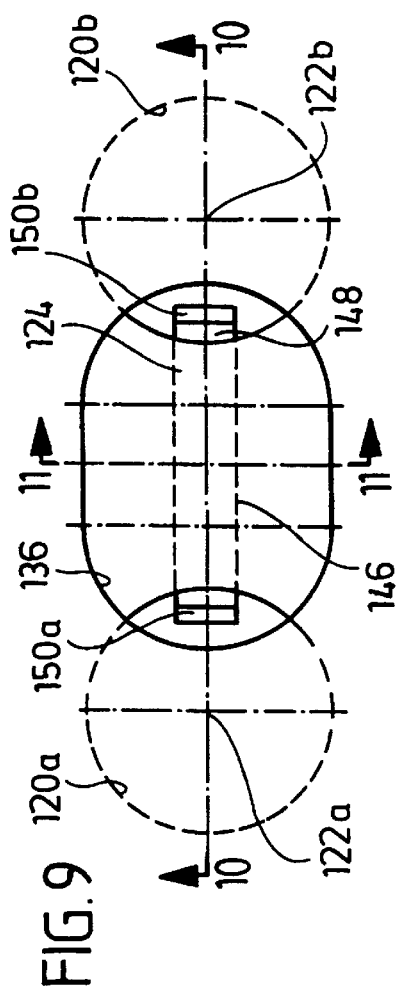

The present disclosure relates to the subject matter disclosed in German Patent Application No. 101 52 797.7 of Oct. 25, 2001, the entire specification of which is incorporated herein by reference.

The present invention relates to a multilayer gasket, which comprises at least one first layer and one second layer and at least one joining device for joining the layers of the gasket to one another.

Such multilayer gaskets are known from prior art.

In particular, it is known to join the layers of a multilayer gasket to one another by riveting or penetrative jointing.

Said types of connection however lead during production of the joint to a build-up of material at right angles to the main surfaces of the gasket, with the result that the joining devices produced by riveting or penetrative jointing have to be disposed outside of the compressed region of the gasket. It is frequently necessary to provide on the layers of the gasket additional straps outside of the compressed region of the gasket in order to allow the joining devices to be accommodated in the region of said straps, which may lead to increased material consumption and to a risk of injury on account of the protruding straps.

It is moreover known to join the layers of a multilayer gasket to one another by welding. It is however not possible to use said joining method if the layers of the gasket are coated, e.g. with an elastomer, because the coating is destroyed by the welding operation. A weld joint is moreover not possible or leads to unreliable results when one or more of the layers of the gasket are formed by nonmetals.

The underlying object of the present invention is therefore to provide a multilayer gasket of the type described initially, in which the layers of the gasket are joined to one another in a simple and reliable manner.

In a gasket having the features of the preamble of claim 1 said object is achieved according to the invention in that the joining device comprises at least two through-openings in the first layer, at least one through-opening in the second layer and a joining element constructed separately from the first layer and the second layer, wherein the joining element penetrates the through-openings of the first layer and the through-opening of the second layer and engages behind a retention region of the second layer in such a way that the first layer, the second layer and the joining element are form locked, preventing them from moving apart from one another.

The underlying concept of the solution according to the invention is therefore to insert a joining element, which is constructed separately from the first layer and the second layer, through the through-openings of the first layer and through the through-opening of the second layer and then deform said joining element by upward bending, spreading and/or upsetting in such a way that a sub-region of the joining element engages behind a retention region of the second layer of the gasket in such a way that the retention region prevents the joining element from moving out of the through-openings and so the first layer, the second layer and the joining element are form locked, thereby preventing said elements of the gasket from moving apart from one another.

In said case, in addition to the first layer and the second layer the multilayer gasket may comprise any desired number of further layers, which are preferably disposed between the first layer and the second layer.

It would be conceivable for the two through-openings in the first layer to be connected to one another by a through-channel and hence form two sub-regions of a continuous through-hole in the first layer.

It is however preferably provided that the two through-openings of the first layer are formed separately from one another.

The solution according to the invention offers the advantage that no welding operation is needed to produce the joint, with the result that the joining device according to the invention may be used in particular also when one or more layers of the gasket are provided with a coating on one or both sides.

In a particular development of the invention it is provided that the joining element comprises at least one strap, which is deformed into the plane of the second layer.

It is particularly advantageous when the joining element comprises at least two straps and a middle region disposed between the straps.

In particular, it may be provided that said middle region is received in the through-opening of the second layer of the gasket.

In a preferred development of the invention it is provided that the middle region of the joining element lies adjacent to a web formed between the through-openings of the first layer.

With regard to the arrangement of the retention region, it is particularly advantageous when the retention region of the second layer is deformed out of the plane of the second layer into the plane of the first layer or into the plane of a layer of the gasket disposed between the first layer and the second layer, should the gasket comprise at least one further layer in addition to the first layer and the second layer.

To prevent the arrangement of the joining element on the gasket from leading to a build-up of material in the region of the joining device, it is advantageous when at least one surface of the joining element is substantially flush with a boundary surface, i.e. with a top or bottom cover surface, of the gasket.

It is particularly advantageous when an upper side of the joining element is substantially flush with an upper side of the gasket and an underside of the joining element is substantially flush with an underside of the gasket.

It is preferably provided that the joining device is disposed in a region of the gasket which, in the installed state of the gasket, is compressed.

This is possible particularly when the joining device is constructed in such a way that it does not form a build-up of material beyond the boundary surfaces of the gasket.

As a result of the arrangement of the joining device in the compressed region of the gasket it is possible to dispense with additional straps at the external contour of the gasket, which are otherwise provided for the arrangement of the joining devices. A spin-off effect of this is that the external contours of the gasket do not project beyond the components to be sealed, thereby lending a more pleasing shape to the component group formed by the gasket and the components to be sealed.

The risk of injury posed by the projecting of the external contours of the gasket beyond the components to be sealed is moreover eliminated.

Further features and advantages of the invention are the subject matter of the following description and the graphic representation of an embodiment.

Figure 10:
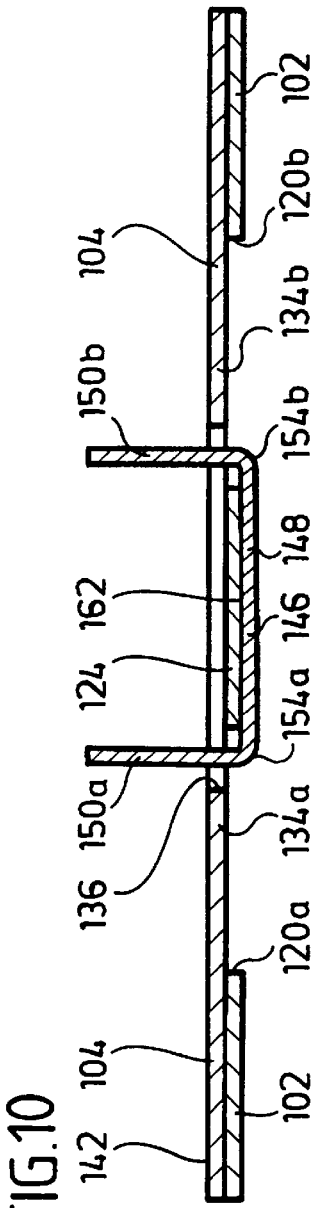

The drawings show in:

FIG. 1 a diagrammatic plan view of a multilayer flat gasket;

FIG. 2 an enlarged view of the region I of FIG. 1;

FIG. 3 a diagrammatic section along the line 3—3 in FIG. 2;

FIG. 4 a diagrammatic section along the line 4—4 in FIG. 2;

FIG. 5 a diagrammatic section along the line 5—5 in FIG. 2;

FIG. 6 a diagrammatic plan view of a joining device in a first phase of manufacture;

FIG. 7 a diagrammatic section along the line 7—7 in FIG. 6;

FIG. 8 a diagrammatic section along the line 8—8 in FIG. 6;

FIG. 9 a diagrammatic plan view of the joining device in a second phase of manufacture;

FIG. 10 a diagrammatic section along the line 10—10 in FIG. 9; and

Figure 11:
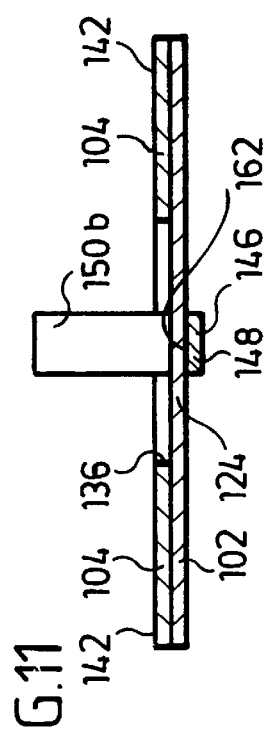

FIG. 11 a diagrammatic section along the line 11—11 in FIG. 9.

Identical or functionally equivalent elements are denoted by the same reference characters in all of the drawings.

A flat gasket illustrated in FIGS. 1 to 5 and denoted as a whole by 100 comprises, as may best be seen from FIG. 3, two superimposed layers, namely a first layer 102 and a layer 104 disposed above the latter and lying flat on the first layer 102.

The layers 102 and 104 preferably comprise a flexible metal material, in particular a spring steel sheet, and may be provided with a coating, in particular with a coating of an elastomer, such as e.g. nitrile butadiene rubber (NBR).

Each of the layers 102, 104 is in the shape of a substantially flat plate, in which through-openings described in detail below have been formed by punching.

The flat gasket 100 is intended to be disposed between two elements (not shown) which are to be sealed, e.g. between an engine block and a cylinder head, wherein the flat gasket 100 is provided with fluid ducts 106 formed by mutually aligned fluid duct through-openings 108 in the first layer 102 and the second layer 104 in order to enable a fluid to pass through the flat gasket 100.

By a fluid in the present description and in the accompanying claims is meant any fluid medium, including liquids and gases.

In order to improve the sealing of the fluid ducts 106, the latter may be surrounded by annular beads (not shown), which are formed in the first layer 102 and/or in the second layer 104.

The two components, between which the flat gasket 100 is disposed, are braced towards one another by suitable fasteners, e.g. by cylinder head bolts and nuts disposed thereon, in order to generate the clamping pressure needed for adequate sealing.

A plurality of, e.g. eight, fastener channels 110 are provided in the flat gasket 100 for receiving said fasteners and are formed in each case by mutually aligned fastener channel through-openings 112 in the first layer 102 and in the second layer 104.

The region of the flat gasket 100 situated between the fastener channels 110 forms a compressed region 116 of the flat gasket 100.

Provided on the flat gasket 100 within the compressed region 116 is a plurality of, e.g. four, joining devices 118 for joining the two layers of the flat gasket 100 to one another, the construction of which joining devices is described in detail below with reference to FIGS. 2 to 5.

As may best be seen from FIG. 2, each of the joining devices 118 comprises two through-openings 120a and 120b, which both take the form of substantially circular through-holes in the first layer 102.

The region of the first layer 102 situated between the two through-openings 120a, 120b forms a web 124, which at least in sections is bent out of the plane of the first layer 102 into the plane of the second layer 104 and comprises an overlap region 132 (indicated by hatching in FIG. 2), which engages behind a middle region 146 of a substantially strip-shaped joining element 148 constructed separately from the first layer 102 and from the second layer 104.

As may best be seen from FIG. 3, the middle region 146 of the joining element 148 is disposed between two straps 150a, 150b forming the two ends of the joining element 148, wherein the left strap 150a is connected to the middle region 146 by a transition region 152a, which along a first bending line 154a adjoins the middle region 146 and along a second bending line 156a adjoins the strap 150a.

The right strap 150b is connected to the middle region 146 by a transition region 152b, which along a first bending line 154b adjoins the middle region 146 and along a second bending line 156b adjoins the strap 150b.

The two straps 150a, 150b of the joining element 148 engage in each case behind a lateral boundary region 134a and/or 134b of a through-opening 136, which is formed in the second layer 104 of the flat gasket 100 and is in the shape of an oval oblong hole with a longitudinal axis 138, which is parallel to the longitudinal axis 158 of the joining element 148.

In the context of the present description and the claims, by a "boundary region" of a through-opening is meant a region, which is situated next to the edge of the relevant through-opening, of the layer, in which the through-opening is formed.

As may be seen from FIG. 3, the lateral boundary regions 134, 134b of the through-opening 136 are bent out of the plane of the second layer 104 into the plane of the first layer 102 of the flat gasket 100.

The undersides of said lateral boundary regions 134a, 134b are substantially flush with the underside 140 of the first layer 102.

The upper side of the overlap region 132 of the web 124 is substantially flush with the upper side 142 of the second layer 104.

Similarly, the upper sides of the straps 150a, 150b of the joining element 148 are substantially flush with the upper side 142 of the second layer 104.

The underside of the middle region 146 of the joining element 148, on the other hand, is substantially flush with the underside 140 of the first layer 102.

By virtue of the fact that the boundary surfaces (i.e. the top and bottom cover surfaces) of the joining device 118 are substantially flush with the boundary surfaces of the layers 102 and 104 of the flat gasket 100, the joining device 118 does not form a build-up of material, with the result that said joining device 118 may be disposed without difficulty within the compressed region 116 of the flat gasket 100.

The fact that the straps 150a, 150b of the joining element 148 engage behind the lateral boundary regions 134a, 134b of the through-opening 136 in the second layer 104 and the fact that the web 124 of the first layer 102 engages behind the middle region 146 of the joining element 148 means that the first layer 102, the second layer 104 and the joining element 148 are form locked, preventing said elements of the flat gasket 100 from moving apart from one another.

The lateral boundary regions 134a, 134b therefore form retention regions 144a, 144b, which retain the joining element 148 in the position, in which it is partially bent into the plane of the second layer 104.

The method of manufacturing the previously described joining device 118 is described below with reference to FIGS. 6 to 11.

First of all, the two through-openings 120a, 120b in the first layer 102 of the flat gasket 100 and the through-opening 136 in the second layer 104 of the flat gasket 100 are produced by punching them out of the appropriate layer.

As may be seen from FIGS. 6 to 8, the first layer 102 and the second layer 104 are then positioned one above the other in such a way that the longitudinal axis 138 of the through-opening 136 of the second layer 104 cuts the centre lines 122a, 122b, which are aligned at right angles to the main surfaces of the flat gasket 100, of the through-openings 120a, 120b of the first layer 102.

The through-opening 136 is moreover disposed centrally between the centre lines 122a, 122b of the through-openings 120a, 120b of the first layer 102.

The web 124, which is formed between the through-openings 120a and 120b of the first layer 102, in said case comes to lie under the through-opening 136 of the second layer 104. As may be seen from FIG. 6, the width of the web 124 at least in the central region of the web 124 is smaller than the length of the through-opening 136.

The through-openings 120a, 120b, on the one hand, and the through-opening 136, on the other hand, mutually overlap in the regions indicated by hatching in FIG. 6 and therefore form insertion channels 160a and 160b, which penetrate the flat gasket 100.

In the next step of the method illustrated in FIGS. 9 to 11, the straps 150a, 150b of the joining element 148, which is in an initial state, are inserted through said insertion channels 160a, 160b, wherein an upper side 162 of the middle region 146 of the connecting element 148 facing the first layer 102 of the flat gasket 100 lies flat against the underside of the web 124 of the first layer 102.

As may be seen from FIGS. 10 and 11, the straps 150a, 150b of the joining element 148 in the initial state thereof are aligned substantially at right angles to the middle region 146 and substantially at right angles to the main surfaces of the flat gasket 100 and adjoin the middle region 146 along the first bending lines 154a, 154b.

In the last step of the method, the straps 150a, 150b of the joining element 148 are bent through an angle of roughly 90° and pressed into the plane of the second layer 104 by means of a folding ram (not shown), wherein the lateral boundary regions 134a, 134b of the through-opening 136 of the second layer 104 are deformed into the plane of the first layer 102, thereby achieving the final configuration of the joining device 118 illustrated in FIGS. 2 to 5.

In order to be able to deform the lateral boundary regions 134a, 134b into the plane of the first layer 102, the length of the straps 150a, 150b is selected in such a way that the ends of the straps 150a, 150b remote from the middle region 146 come to lie entirely over the through-openings 120a, 120b and do not project beyond the latter.

During said bending of the straps 150a, 150b around the two bending lines 156a, 156b the transition regions 152a, 152b of the joining element 148 are simultaneously formed, which in the final configuration of the joining device 118 extend from the plane of the first layer 102 into the plane of the second layer 104.

Simultaneously with the folding-over of the straps 150a, 150b, the middle region 146 and the overlap region 132 of the web 124 are deformed in the direction of the plane of the second layer 104 of the flat gasket 100 by means of a push-through ram (not shown), so that in the final configuration of the joining device 118 the overlap region 132 of the web 124 comes to lie in the plane of the second layer 104 and the middle region 146 of the joining element 148 comes to lie in the plane of the first layer 102.

Manufacture of the joining device 118 is therefore complete.

What is claimed is:

1. Multilayer gasket, comprising at least one first layer and one second layer and at least one joining device for joining the layers of the gasket to one another, wherein the joining device comprises at least two through-openings in the first layer, at least one through-opening in the second layer and a joining element constructed separately from the first layer and the second layer, wherein the joining element penetrates the through-openings of the first layer and the through-opening of the second layer and engages behind a retention region of the second layer in such a way that the first layer, the second layer and the joining element are form locked, preventing them from moving apart from one another.

2. Gasket according to claim 1, wherein the joining element comprises at least one strap, which is deformed into the plane of the second layer.

3. Gasket according to claim 1, wherein the joining element comprises at least two straps and a middle region disposed between the straps.

4. Gasket according to claim 3, wherein the middle region is received in the through-opening of the second layer.

5. Gasket according to claim 3, wherein the middle region of the joining element lies adjacent to a web formed between the through-openings of the first layer.

6. Gasket according to claim 1, wherein the retention region of the second layer is deformed out of the plane of the second layer into the plane of the first layer or into the plane of a layer of the gasket disposed between the first layer and the second layer.

7. Gasket according to claim 1, wherein at least one surface of the joining element is substantially flush with a boundary surface of the gasket.

8. Gasket according to claim 7, wherein an upper side of the joining element is substantially flush with an upper side of the gasket and an underside of the joining element is substantially flush with an underside of the gasket.

9. Gasket according to claim 1, wherein the joining device is disposed in a region of the gasket which, in the installed state of the gasket, is compressed.

* * * * *

UNITED STATES PATENT AND TRADEMARK OFFICE
CERTIFICATE OF CORRECTION

PATENT NO. : 6,722,661 B2  
DATED : April 20, 2004  
INVENTOR(S) : Wolfgang Fritz It is certified that error appears in the above-identified patent and that said Letters Patent is hereby corrected as shown below:

<u>Title page,</u>
Item [73], Assignee, replace with -- ElringKlinger AG --.

Signed and Sealed this

Thirteenth Day of July, 2004

JON W. DUDAS
*Acting Director of the United States Patent and Trademark Office*